Patented May 7, 1929.

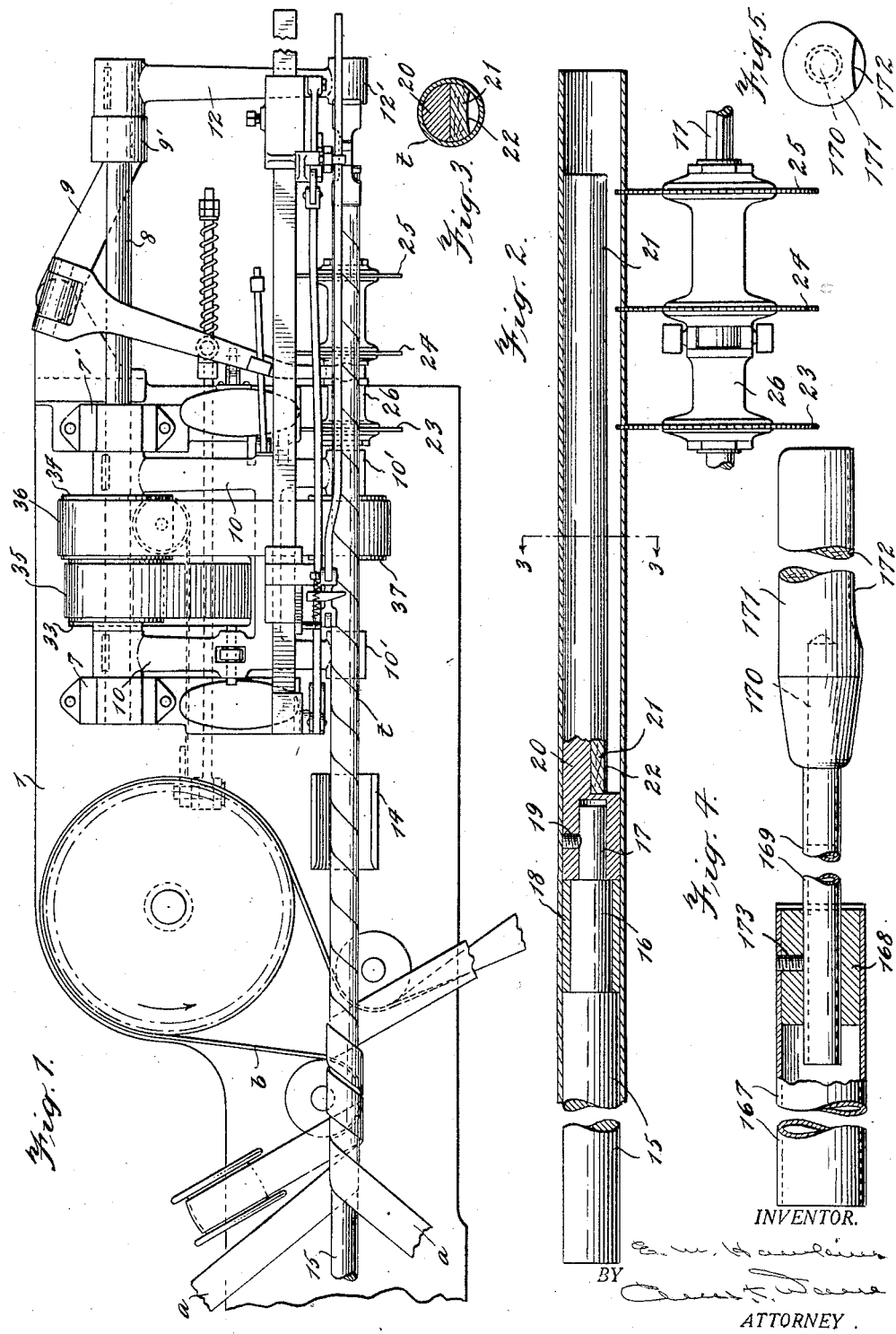

1,711,942

UNITED STATES PATENT OFFICE.

EDGAR M. HAWKINS, OF ROCHESTER, NEW YORK, ASSIGNOR TO M. D. KNOWLTON COMPANY, OF ROCHESTER, NEW YORK, A CORPORATION OF NEW YORK.

MANDREL FOR TUBE-CUTTING MACHINES.

Application filed June 9, 1927. Serial No. 197,650.

The invention relates to mandrels for use in connection with tube cutting machines, such as exemplified in application Serial No. 196,351, filed June 3, 1927, and has for its object the provision of a mandrel which will accurately guide the tubing through the cutting machine and properly support the travelling tubing and the sections cut therefrom during the cutting operation; the mandrel being provided with a section or continuation extending throughout the range of movement of the cutting mechanism and comprising a relatively soft material, such as wood, that is readily penetrable by the cutter or cutters and will not damage the latter in the event that the movement of the cutting mechanism transversely of the path of travel of the tubing is excessive and sufficient to bring the cutter or cutters into contact with the mandrel.

The invention is illustrated in the accompanying drawings, in which:

Fig. 1 is a plan view of a tube cutting machine equipped with a mandrel embodying my invention.

Fig. 2 is a detail plan view, partly in section, of the mandrel, the tubing supported thereby, and a gang of cutters in operative engagement with the tubing.

Fig. 3 is a cross section on line 3—3 of Fig. 2.

Fig. 4 is a plan view, partly in section, of a modified form of mandrel.

Fig. 5 is an end view of the same.

While the mandrel constituting the present invention may be employed in connection with or as a part of a cutting machine of any usual or suitable construction, it is here illustrated in connection with the type of cutting machine exemplified in the application aforesaid, which comprises a frame bed 1 upon which the cutting mechanism is mounted, which bed constitutes a continuation of the bed of a tube forming machine, which may be of usual construction and operation, in which a continuous length of tubing is produced by overlapping spirally wound strips of paper and the like, a, a, cemented together by a suitable adhesive, and which tubing is fed forward upon its supporting mandrel 15 to the cutting machine with a continuous movement by the winding and feeding belt b.

Secured on the table 1 at the right of this tube forming mechanism are pedestals 7, 7' in which is journaled a horizontal shaft 8, the outer end of which is also journaled in a bearing 9' on a bracket 9 secured to the front end of the table. Keyed to the shaft 8 in proper spaced relation are two arms 10, 10 provided at their ends with journal bearings 10', 10' which support a cutter carrying arbor 11, the outer end of which is journaled in a bearing 12' on an arm 12 keyed to the outboard end of the shaft 8, the several parts being so arranged that the arbor 11 with its supported cutters is adapted to be swung about the shaft 8 as an axis in effecting a movement of the cutters to and from their tube cutting position.

Also mounted on top of the table 1 is a vertically adjustable trough-like member 14 adapted to receive the tubing to be cut, which tubing, indicated at t, is shown as supported on the mandrel 15, which is adapted to be continued through the cutting machine above and in parallelism with the cutter arbor 11 to constitute a support for the tubing and the sections being cut, the extreme end of the mandrel being beyond the outer limit of traverse of the cutting mechanism. The cutters, preferably in the form of disk saws, are, in the machine here shown, three in number, to wit, 23, 24 and 25, spaced at intervals on a sleeve 26 which is slidably mounted for longitudinal movement on the arbor 11 and has a splined connection with the latter to be rotated therewith. Loosely journaled on shaft 8 is a double pulley comprising members 33 and 34, the former being connected by a belt 35 to a pulley on the shaft of a driving motor (not shown), and the member 34 being connected by a belt 36 to a pulley 37 fast to the cutter arbor 11. It will be understood that with this particular coordination of parts, the continuous drive of the cutters is assured so long as the driving motor is operated, with the cutter arbor in its lowermost inoperative position and the saws or cutters out of contact with the tubing carried by the mandrel, but adapted to be projected into the path of travel of the tubing at predetermined times by suitable actuating means (not shown), and to travel with the tubing in the cutting operation, all as fully disclosed in the application aforesaid.

Referring now more particularly to the mandrel constituting the subject of the present application, the initial section of this, indicated at 15, is substantially cylindrical in cross section and of proper diameter to constitute either the mandrel of the tube forming machine upon which the tubing is formed, as shown for example in Fig. 1, or said section may constitute the receiving end of the mandrel of the cutting machine per se, which receives the preformed tubing and properly enters the same into the cutting machine.

The forward end of section 15 is preferably provided with two reduced end portions 16 and 17, upon the former of which is mounted a thimble 18. Secured to the reduced outer end 17 is a continuation or extension 20 of the mandrel provided with a socket in its end, which is engaged by the reduced end 17 of the initial section 15, the parts being locked in engagement by means of a set screw 19. The major part of the section 20, namely, that portion extending throughout the range of movement of the cutting mechanism both transverse and parallel relative to the travel of the tubing, is substantially semi-cylindrical, and secured to and overlying the flat face of the section 20 is a strip 21 of relatively soft penetrable material, such as wood or the like, which will not damage the cutting edges should the cutter or cutters come into engagement therewith due to an excessive movement of the cutter mechanism transversely of the path of travel of the tubing during the cutting operation. The strip 21 may be attached to the section 20 by any appropriate means, as, for example, by screws or a longitudinal dovetailed joint between the strip 21 and the flat face of section 20, which modes of securing the parts together will permit of the ready removal and replacement of the strip should the latter be seriously damaged. The sides of the strip 21 conform to the curvature of the mandrel, and preferably the face of the strip adjacent the edges of the cutters is concaved transversely, with a curvature substantially the same as that of the edges of the cutters, as indicated at 22, to provide clearance for the cutters.

In the normal cutting operation, the tubing $t$ is fed along and rotated about the mandrel continuously, the cutters which are continuously driven being advanced toward the mandrel until they engage the travelling tubing and are carried along with the latter until the cutting operation is completed, after which the cutters are withdrawn to their initial position, out of the path of travel of the tubing. It sometimes happens that the movement of the cutter mechanism to project the cutters into cutting engagement with the travelling tubing is excessive, so that the edges of the cutters will be forced into contact with the mandrel with a consequent damage to the cutters, if an all metal mandrel were employed. It is desirable that the tubing be supported on the mandrel substantially throughout the interior surface of the tubing in order to prevent the latter buckling or being forced away from the mandrel, when engaged by the cutters, and it will be noted that this particular construction and arrangement of mandrel prevents any transverse movement of the tubing relatively to the mandrel and, at the same time, insures the cutters against damage by contact with any hard resistant portion of the mandrel, the edges of the cutters, when they do happen to encounter the mandrel, readily penetrating the wooden strip without in any way damaging the cutters.

In cutting tubing of relatively large sizes in machines of the general character referred to, it is desirable to make the mandrels as light as possible and render the parts liable to damage by engagement with the cutters readily replaceable. Under such conditions, the form of mandrel shown in Figs. 4 and 5 is preferred, the same comprising a cylindrical initial section 167, which is preferably tubular, in the end of which is fitted a tubular plug 168, in the bore of which is fastened a small tubular section 169, which may be of any desired length, said member being locked in position by a pin or set screw 173, which also serves to lock the plug 168 in place. In the forward end of the tubular member 169 is fixed a pin 170 secured in the end section 171, preferably of wood or similar material and of a length sufficient to extend throughout the full length of movement of the cutting mechanism parallel with the travelling tubing. This extension 171 is generally cylindrical, except the face portion thereof that is presented to the edges of the cutting mechanism, which is preferably concaved, as at 172, to the extent and for the same purpose as the concave face 22 of the mandrel first described.

It will be noted that this particular form of mandrel possesses substantially the same advantages as the form previously described, together with the additional advantages that it is more readily constructed, assembled and repaired, is much lighter in weight and includes the relatively cheap and readily replaceable section 171, which is the only part liable to damage.

What I claim is:

1. A mandrel for tube cutting machines comprising a substantially cylindrical metal section having a substantially semi-cylindrical extension, and a facing strip of relatively soft material secured to the flat face of said extension.

2. A mandrel for tube cutting machines comprising a substantially cylindrical metal section having a substantially semi-cylindrical extension, and a facing strip of relatively soft material secured to the flat face of said extension, said facing strip having a concaved face parallel with the traverse of the cutting mechanism.

3. A mandrel for tube cutting machines comprising a substantially cylindrical metal section having a reduced cylindrical end, a substantially semi-cylindrical extension having a socketed connection with said reduced end and a facing strip of relatively soft material secured to the flat face of the extension having sides conforming to the contour of the cylindrical section and a concaved face parallel with the traverse of the cutting mechanism.

In testimony whereof I affix my signature.

EDGAR M. HAWKINS.